March 3, 1942. C. N. KIMBERLIN 2,275,151
RECOVERY OF ETHYL CHLORIDE FROM ETHYL CHLORIDE-BUTANE MIXTURES
Filed Nov. 3, 1939
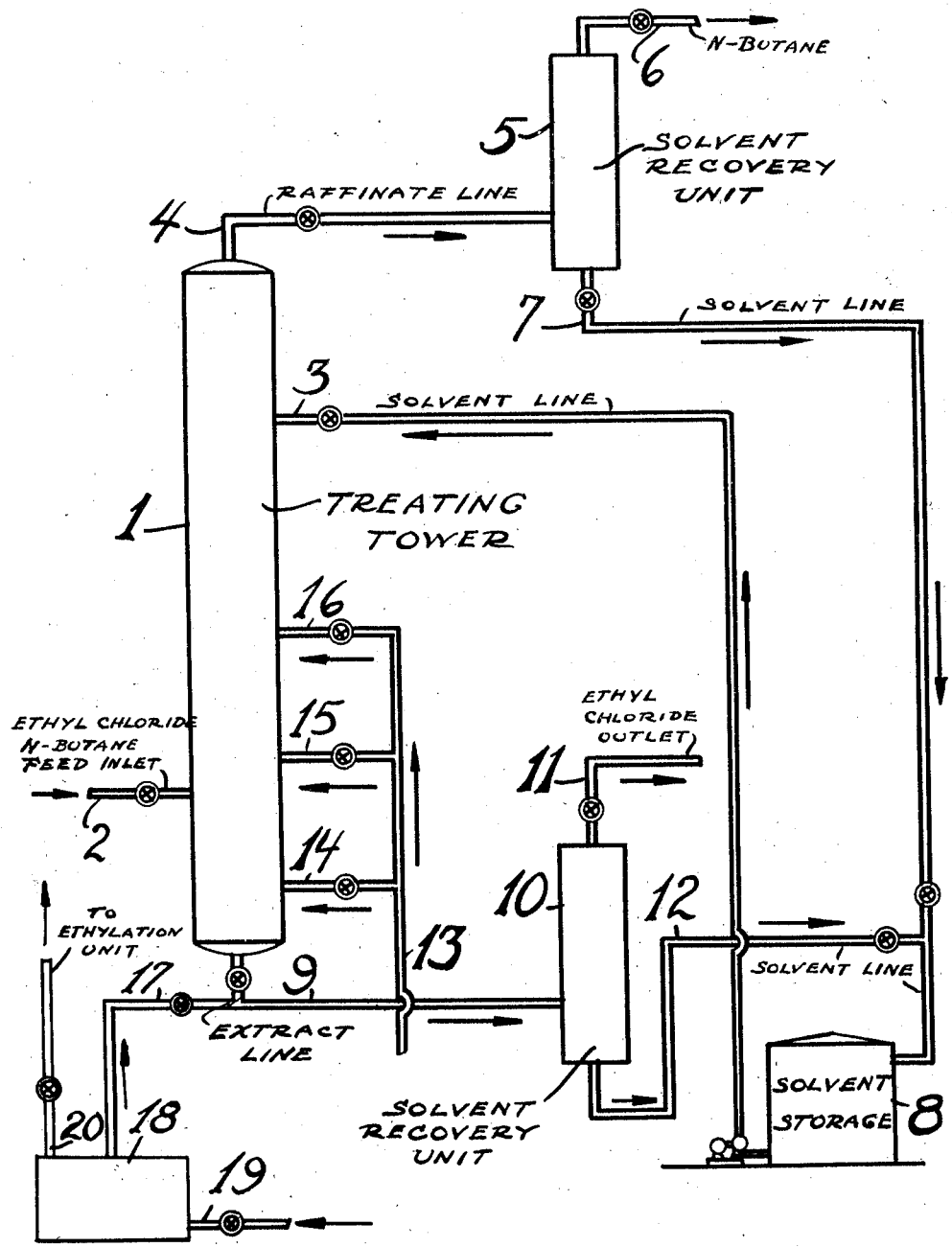
Charles N. Kimberlin Inventor
By P. L. Young Attorney Patented Mar. 3, 1942

2,275,151

UNITED STATES PATENT OFFICE 2,275,151

RECOVERY OF ETHYL CHLORIDE FROM ETHYL CHLORIDE-BUTANE MIXTURES

Charles N. Kimberlin, Baton Rouge, La., assignor to Standard Oil Development Company, a corporation of Delaware Application November 3, 1939, Serial No. 302,752

7 Claims. (Cl. 260—652)

The invention is especially concerned with a method for the recovery of ethyl chloride, particularly for the recovery of ethyl chloride from its azeotropic mixture with butane. Such mixtures are obtained in the manufacture of tetraethyl lead. In accordance with the present invention, ethyl chloride is separated and recovered from butane by treatment with a suitable solvent.

It is known in the art to prepare tetraethyl lead by various processes. A current procedure for the preparation of this compound is to react ethyl chloride with lead under suitable operating conditions. This may be accomplished by treating a sodium lead alloy with an excess of ethyl chloride at pressures up to about 100 pounds per square inch and at temperatures in the range from 30° C. to 80° C., preferably in the presence of a catalytic substance such as pyridine or ethyl bromide. Upon completion of the reaction, which may require several hours, the tetraethyl lead is separated from the mixture and the unreacted materials are recovered in so far as possible by any suitable means, usually by distillation. However, the complete recovery of the unreacted ethyl chloride is difficult due to the fact that a relatively large quantity of normal butane is formed in a side reaction, which butane forms an azeotropic mixture with the unreacted ethyl chloride. The loss of this unreacted ethyl chloride associated with the butane materially raises the cost of the ethylation process and various processes have been directed for the recovery of the same.

I have now discovered a process by which the unreacted ethyl chloride may be fully and readily recovered. The process of my invention comprises treating the mixture of ethyl chloride and normal butane with a selective solvent having a preferential selectivity for the ethyl chloride as compared to butanes and the like. The solvents of my invention comprise alcohols, particularly aqueous solutions of alcohols. The process of my invention may be readily understood by reference to the attached drawing illustrating one modification of the same.

A mixture comprising ethyl chloride and normal butane secured in the ethylation of lead with ethyl chloride is introduced into countercurrent treating tower 1 by means of feed line 2. This mixture flows upwardly through tower 1 and contacts a downflowing solvent which is introduced into tower 1 by means of solvent feed line 3. For purposes of description, it is assumed that the solvent is a mixture of ethyl alcohol and water. Tower 1 is provided with suitable contacting and distributing means. The temperature and pressure conditions maintained in tower 1 will depend upon the particular solvent being used, as well as upon other operating conditions, and are adapted to secure the formation of a raffinate phase and a solvent extract phase. In general, the pressure should be in the range from about atmospheric to about 200 pounds per square inch and the temperature in the range between about −10° C. to about 100° C. The raffinate phase or relatively solvent poor phase substantially free of ethyl chloride is withdrawn from tower 1 by means of line 4 and passed into solvent recovery unit 5, wherein the solvent is removed from the butane, preferably by distillation. The butane is removed from solvent recovery unit 5 by means of line 6, while the butane free solvent is removed by means of line 7 and recycled to solvent storage 8. The solvent extract free of butanes containing the dissolved ethyl chloride is removed from solvent treating tower 1 by means of line 9 and passed into solvent recovery unit 10 which is preferably a distillation unit. The ethyl chloride is removed by means of line 11 and recycled to the ethylation plant, while the ethyl chloride free solvent is removed from unit 10 by means of line 12 and recycled to solvent storage 8. It is to be understood that the selectivity and solvent power of the selective solvent may be modified by the addition of anti-solvents which are introduced into the system by means of lines 13, 14, 15, and 16 respectively. Treating tower 1 may also be provided with added heating and cooling means in order to maintain a temperature gradient throughout the tower.

A preferred modification of the present invention is to utilize as the selective solvent ethyl alcohol. The solvent extract comprising ethyl alcohol and the dissolved ethyl chloride is removed from solvent treating tower 1 by means of line 17 and then introduced into reaction vessel 18. The solvent extract is then treated with hydrogen chloride or an equivalent agent which is introduced into vessel 18 by means of line 19 under conditions to convert the ethyl alcohol into ethyl chloride. The reaction product comprising ethyl chloride and the dissolved ethyl chloride is then withdrawn from unit 18 and returned to the ethylation plant by means of line 20.

The process of the present invention may be widely varied. The process may be adapted for the removal of ethyl chloride from butane and ethyl chloride mixtures varying widely in composition. However, the invention is particularly applicable in the removal of ethyl chloride from azeotropic mixtures of butane and ethyl chloride comprising about 80% butane and about 20% ethyl chloride. Thus, the preferred operation for the manufacture of tetraethyl lead is to remove the excess ethyl chloride containing the butane from the ethylation unit and to distill the same, removing as a bottoms ethyl chloride and removing as an overhead an azeotropic mixture of ethyl chloride and butane. The overhead mixture is then condensed and solvent treated in the manner described for the complete recovery of the ethyl chloride.

Any solvent which has a preferential selectivity for ethyl chloride as compared to butane may be used. Suitable solvents are, for example, methyl alcohol, ethyl alcohol, isopropyl alcohol, or mixed alcohols. Poly-hydroxy alcohols such as ethylene glycol or propylene glycol are also suitable. The preferred solvents are those alcohols which have from one to four carbon atoms in the molecule. Especially desirable solvents are aqueous solutions of alcohols, particularly a solvent comprising from 50% to 80% ethyl alcohol and from 50% to 20% water.

The operating conditions will vary widely, depending upon the particular solvent or solvent mixture being employed, as well as upon the character of the feed material. In general, the temperature of extraction when employing aqueous solutions of alcohols having from one to four carbon atoms in the molecule is preferably in the range from about 15° C. to about 30° C. Under certain conditions, however, the temperature may be as low as —10° C. or as high as 100° C. The pressure employed is sufficient to maintain the materials in the liquid phase and will depend to a large extent upon the temperature of the operation. In general, the pressure is in the range from about atmospheric pressure to about 200 pounds per square inch or higher.

The volume of solvent used per volume of feed being extracted likewise may vary widely, depending upon the particular solvent or solvent mixture used. In general, when employing a solvent comprising ethyl alcohol and water, it is preferred to use from one to four volumes of solvent mixture per volume of stock being treated.

In order to further illustrate the invention, the following example is given which should not be construed as limiting the same in any manner whatsoever:

Example

Azeotropic mixtures of butane and ethyl chloride were solvent treated at atmospheric pressure in accordance with the present invention with solvents comprising ethyl alcohol and various percentages of water. The results of these operations were as follows:

| Solvent composition | Pts. by vol. used | Feed 80% butane, 20% ethyl chloride | Temp. | Extract | | Raffinate | | Ethyl chloride in solvent free extract | Ethyl chloride recovered |
|---|---|---|---|---|---|---|---|---|---|
| | | | | Ethyl chloride | Butane | Ethyl chloride | Butane | | |
| | | Pts. by vol. | °C. | Pts. by vol. | Pts. by vol. | Pts. by vol. | Pts. by vol. | Percent | Percent |
| 90% C₂H₅OH, 10% H₂O | 100 | 100 | —10 | 17 | 37 | 3 | 43 | 31.5 | 85.0 |
| 80% C₂H₅OH, 20% H₂O | 200 | 100 | —10 | 18.5 | 25.5 | 1.5 | 54.5 | 42.0 | 92.5 |
| 70% C₂H₅OH, 30% H₂O | 250 | 125 | —10 | 25 | 1 | 0 | 97 | 96.2 | 100.0 |

The process of the present invention is not to be limited by any theory or mode of operation, but only by the following claims in which it is desired to claim all novelty in so far as the prior art permits.

I claim:

1. Process for the separation of ethyl chloride from a mixture comprising ethyl chloride and butane comprising contacting said mixture with an alcohol, separating the resulting phases and removing the alcohol therefrom.

2. Process for the separation of ethyl chloride from a mixture comprising ethyl chloride and butane comprising contacting said mixture with an aqueous solution of an alcohol, separating the resulting phases and removing the alcohol and water therefrom.

3. Process for the separation of ethyl chloride from a mixture comprising ethyl chloride and butane comprising contacting said mixture with an aliphatic alcohol containing from one to four carbon atoms in the molecule, separating the resulting phases and removing the alcohol therefrom.

4. Process according to claim 1 in which the alcohol is ethyl alcohol.

5. Process according to claim 2 in which the aqueous solution of the alcohol comprises from 50% to 80% ethyl alcohol and 50% to 20% water.

6. Process in accordance with claim 2 in which the aqueous alcohol comprises about 70% ethyl alcohol and about 30% water.

7. Process for the recovery of ethyl chloride from a mixture comprising ethyl chloride and butane, said mixture being secured as a by-product in the manufacture of tetraethyl lead, comprising contacting said mixture of ethyl chloride and butane at a temperature in the range of from about —10° C. to about 30° C. at a pressure sufficient to maintain the materials in the liquid phase with an aqueous solution of an aliphatic alcohol containing from one to four carbon atoms in the molecule, separating the resulting phases and removing the alcohol and water therefrom.

CHARLES N. KIMBERLIN.